April 24, 1962
M. J. MORAN
3,031,631
WAVEGUIDE SWITCHES
Filed Nov. 7, 1960
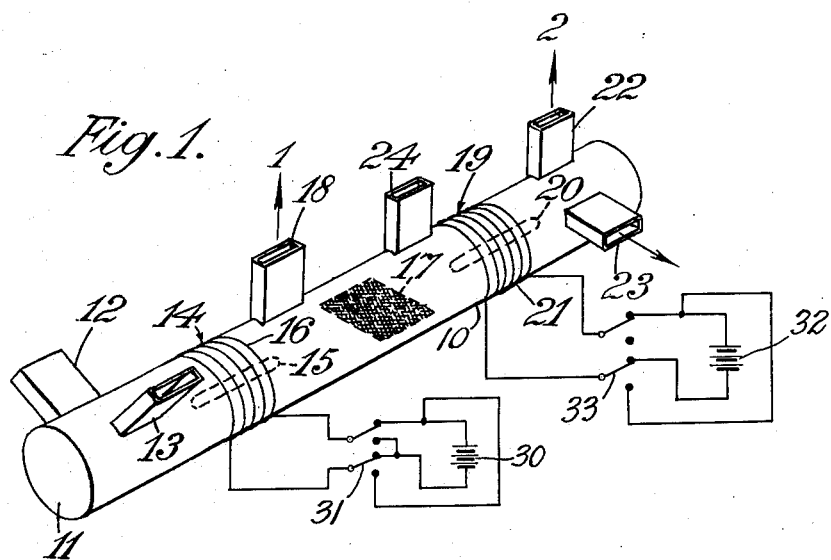
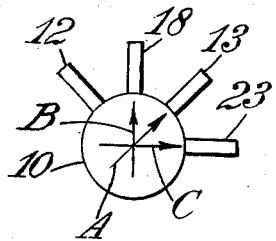

ns Patent Office
3,031,631
Patented Apr. 24, 1962

3,031,631
WAVEGUIDE SWITCHES
Michael James Moran, London, England, assignor to The Decca Record Company Limited, London, England, a British company
Filed Nov. 7, 1960, Ser. No. 67,749
Claims priority, application Great Britain Nov. 10, 1959
6 Claims. (Cl. 333—7)

This invention relates to waveguide switches such as may be used, for example, for coupling a transmitter and/or a receiver alternatively to two or more different aerials.

According to one aspect of this invention a waveguide switch comprises a length of circular waveguide, first coupling means coupling to the waveguide for signals propagated therein in a $TE_{11}$ mode in one plane of polarisation, second and third coupling means spaced from said first coupling means and coupling to the waveguide for signals propagated therein in $TE_{11}$ modes in two different planes at right angles, and a Faraday polarisation rotator in said waveguide between said first coupling means and said second and third coupling means switchable to alter the plane of polarisation of an incident $TE_{11}$ mode signal alternatively between two planes at right angles so as to effect coupling between said first and second coupling means or between said first and third coupling means.

If signals are to be fed from said first coupling means alternatively to said second or said third coupling means, the Faraday polarisation rotator is arranged so that in one switched condition signals fed in to the circular waveguide at said first coupling means to be propagated as a $TE_{11}$ mode have their plane of polarisation rotated to the plane appropriate to said second coupling means and in the other switched condition have the plane of polarisation in the plane appropriate for coupling the said third coupling means. If only one way transmission is required, the Faraday polarisation rotator might be arranged, for example, to effect no rotation in one condition and to effect 90° of rotation in the other condition or to effect rotation of 45° in one sense of one condition and of 45° in the opposite sense of the other condition. If on the other hand it is required to have two way propagation through the switch so that signals can be fed into the switch at said first coupling means for transmission to either said second or said third coupling means with corresponding switch connections for the reverse direction of transmission, the Faraday polarisation rotator since it is a non-reciprocal device would have to be arranged to effect zero rotation in one switch condition and 90° rotation in the other switch condition.

The present invention finds particular application for switching signals from a transmitter alternatively to two different aerials and in that case, the device can be arranged also to effect duplexing by providing, in addition to and on the same side of the polarisation rotator as said first coupling means, further coupling means coupling to the circular waveguide for signals propagated therein in a $TE_{11}$ mode at right angles to the plane of polarisation of signals coupled to said first coupling means. The first coupling means and said further coupling means may then be connected respectively to a transmitter and receiver and, by arranging the Faraday polarisation rotator to effect rotation of 45° in one sense for one switch condition and 45° in the other sense for the other switch condition, signals fed in from the transmitter may be coupled alternatively according to the condition of the polarisation rotator to either the second or third coupling means and thence fed to separate aerials whilst signals received at these aerials will, after passing through the polarisation rotator, be fed into said further coupling means and thence to the receiver.

Considered from another aspect the invention also includes in its scope a waveguide switch comprising a length of circular waveguide, means for feeding signals into the waveguide so as to be propagated in a $TE_{11}$ mode, a polarisation dependent short-circuit in said circular waveguide arranged to prevent the transmission through the waveguide of signals polarised in a first plane but to permit the passage of signals polarised in a second plane at right angles to said first plane, a Faraday polarisation rotator for rotating the plane of polarisation alternately between said first and second planes and a port in said circular waveguide between said Faraday polarisation rotator and said short-circuit, which port is coupled to said circular waveguide only for signals polarised in said first plane. It will be seen that with this construction signals may be fed into one end of the circular waveguide and after passing through the polarisation rotator will, according to the condition of the polarisation rotator, either pass out through the port or pass on through the circular waveguide beyond the short-circuit. It will readily be seen that two or more such switches may conveniently be arranged in series since signals are fed into one end of a circular waveguide and, in one condition of the switch, pass straight through the waveguide to the other end thereof. The polarisation dependent short-circuit conveniently comprises a conductive plate arranged in a diametral plane in the waveguide.

The following is a description of a combined aerial switch and duplexer embodying the invention, reference being made to the accompanying drawings in which:

FIGURE 1 is a diagrammatic perspective view of the switch and duplexer; and

FIGURE 2 is an end view of the switch and duplexer.

The device illustrated in the drawings is arranged to act as a duplexer connecting a transmitter and a receiver to any one of three separate aerials, the switch in any one condition ensuring that signals in the transmitter pass only to the selected aerial and that, in this condition, only signals from this selected aerial pass to the receiver.

Referring to the drawings, the switch comprises a length of circular waveguide 10 which is closed at its two ends by short circuits formed by conductive plates 11 across the ends of the waveguide 10. Near one end of the waveguide there are two ports in the cylindrical surface of the circular waveguide 10 which ports are connected to rectangular waveguides 12, 13. The rectangular waveguides have their axes extending radially from the axis of the circular waveguide 10 and the two ports are disposed in orthogonal diametral planes with respect to the axis of the circular waveguide and are of rectangular shape with their longer sides parallel to the axis of the circular waveguide 10 so that signals transmitted in a $TE_{01}$ mode through the rectangular waveguides 12, 13 are coupled via these ports into the circular waveguide 10 as signals to be propagated through the circular waveguide in a $TE_{11}$ mode and vice versa. One of these ports, is connected by the rectangular waveguide 12 to the transmitter and the other is connected by the rectangular waveguide 13 to the receiver. It will be seen that the transmitter and receiver are coupled to the circular waveguide 10 respectively for signals in $TE_{11}$ modes with planes of polarisation at right angles.

Beyond these two ports in the circular waveguide is arranged a first Faraday polarisation rotator 14 comprising a matched ferrite rod 15 in the waveguide with an external energising coil 16. The current through this coil can be switched to give two alternative polarisation rotations. Means for switchably energizing the coil 16 are indicated diagrammatically by a battery 30 and polarity reversing switch 31. This first polarisation rotator 14 is arranged so that it effects rotation of the plane of polarisation of a $TE_{11}$ mode signal through an angle of 45°, the polarisation rotator being arranged so that the rotation can be 45° in one sense or the other according to the switched alternative energisation of the coil 16 of the rotator.

A $TE_{01}$ wave fed from the transmitter through the waveguide 12 will be launched into the circular waveguide in a $TE_{11}$ mode with the plane of polarisation in the direction of the arrow A in FIGURE 2. This signal therefore is de-coupled from the receiver waveguide 13. The polarisation rotator 14 can effect change of the plane of polarisation into either the direction indicated by the arrow B or the direction indicated by the arrow C in FIGURE 2.

In the circular waveguide beyond this polarisation rotator is a polarisation dependent short-circuit comprising a flat conductive plate 17 in a diametral plane which is at 45° to the diametral planes of the ports coupled to the transmitter and receiver. Such a short-circuit will pass, without change, signals polarised at right angles to the plate, that is in the direction of the arrow B, but will act as a short-circuit and so prevent the passage of signals polarised in the plane of the plate that is in the direction of the arrow C. The first polarisation rotator 14 will thus change the plane of polarisation of the $TE_{11}$ mode signals in the circular waveguide from the transmitter between two alternative conditions such that the signals either pass this short-circuit or are blocked by it. Between the polarisation dependent short-circuit 17 and the first polarisation rotator 14 is a rectangular outlet port coupled by a rectangular waveguide 18 to a first aerial, this port being so positioned that it is coupled to feed into the rectangular waveguide, as $TE_{01}$ mode signals, signals propagated through the circular waveguide with the plane of polarisation that is blocked by the aforementioned polarisation dependent short-circuit, that is signals with the plane of polarisation indicated by the arrow C. This outlet port thus lies in a radial plane, with respect to the axis of the circular guide, which bisects the angle between the radial planes in which lie the transmitter and receiver ports.

Beyond the polarisation dependent short-circuit 17 is a second Faraday polarisation rotator 19 also comprising a matched ferrite rod 20 in the circular waveguide and an external energizing coil 21 and arranged to effect rotation of the plane of polarisation of $TE_{11}$ mode signals through either 0° or 90°. Means for switchably energizing the coil 21 are indicated diagrammatically by a battery 32 and a polarity reversing switch 33. Beyond this second polarisation rotator are two further rectangular outlet ports coupled by rectangular waveguides 22, 23 to the second and third aerials respectively, these outlet ports being in orthogonal planes so that $TE_{01}$ mode signals in these rectangular waveguides 22, 23 are coupled to the circular waveguide for two orthogonal planes of polarisation of $TE_{11}$ modes of propagation. The outlet ports leading to the second and third aerials are so oriented with respect to the axis of the circular waveguide that signals passing the polarisation dependent short-circuit 17 are coupled to the second outlet port and waveguide 22 if the polarisation rotator 19 gives zero rotation but are coupled to the third outlet and waveguide 23 if the signals have been rotated through 90° in their plane of polarisation by the second polarisation rotator 19. The second port will thus be in a radial plane aligned with the radial plane of the first outlet port whilst the third port will be in an orthogonal radial plane. It will be seen that transmitted signals will be fed from the transmitter through waveguide 12 into the circular waveguide 10 and, according to the switch condition of the first polarisation rotator 14, will either pass out to the first aerial through waveguide 18 or will pass along the circular waveguide 10 beyond the polarisation dependent short-circuit 17 and then, according to the condition of the second polarisation rotator 19, will pass out to the second or third aerial through waveguide 22 or 23 respectively. If the transmitter is coupled to the first aerial, the first polarisation rotator 14, since it is a non-reciprocal device, will couple any signals from waveguide 18 received by the first aerial to the receiver. Any signals received at the second and third aerials in this condition, if they should pass the polarisation dependent short-circuit 17, would not be coupled to the receiver because of the rotation of the plane of polarisation effected by the first polarisation rotator. If the transmitter is coupled to the second aerial, the signals received at the second aerial will pass to the receiver but will be de-coupled from the first and third aerials because the ports leading to these aerials are in a radial plane orthogonal to that of the port coupled to the second aerial. Likewise if the transmitter is coupled to the third aerial, signals received at the third aerial only will pass to the receiver. The receiver is always de-coupled from the transmitter since the receiver and transmitter ports are in orthogonal radial planes.

It is possible that there may be cross-coupling between the second and third aerials externally of the switch and for this reason preferably a further port is arranged in the circular waveguide between the polarisation dependent short-circuit and said second polarisation rotator, which port is aligned with the ports leading to the first and second aerials and is connected by a rectangular waveguide 24 to a dummy load. It will be seen that this further port with its dummy load is not coupled to the circular waveguide 10 for any signals from the transmitter passing the polarisation dependent short-circuit 17. It will, however, be coupled to the second aerial if the third aerial is selected or vice versa. This further port will not therefore affect the transmission or reception of signals from the selected aerial but, in its associated dummy load, will absorb signals picked up by the second or third aerial due to cross-coupling between these aerials.

Although in the above described embodiment, the circular waveguide 10 is terminated in a short-circuit 11 beyond the second and third outlet ports, it would be possible to use only one of these ports and to have a polarisation dependent short-circuit at the end of the circular waveguide so that, in one switch condition of the second polarisation rotator, signals will pass through the open end of circular waveguide. This might be coupled to the second (or third) aerial or might be connected to a further switch section comprising a circular waveguide with a polarisation rotator and two outlet ports, thereby enabling the assembly as a whole to be used for switches between four aerials.

It will be seen that the device described makes use of the Faraday polarisation rotator 14 to effect duplexing for connecting the transmitter and receiver to the selected aerial for transmission or reception and that this polarisation rotator 14 also effects switching between the waveguide 18 leading to the first aerial and the further section of circular waveguide 10 beyond the polarisation dependent short circuit 17. The device also makes use of a further polarisation rotator 19 forming a switching device for selectively coupling the waveguide 10 beyond this polarisation dependent short circuit 17 either to a second or to a third aerial and, as indicated above, further Faraday polarisation rotators could be employed if further choice of aerial selection is required.

I claim:

1. A multi-port aerial switch and duplexer comprising a length of circular waveguide, transmitter and receiver coupling means at or adjacent one end of the circular waveguide and arranged for coupling to the waveguide for signals propagated therein in $TE_{11}$ modes in first and second orthogonal planes of polarisation, a first Faraday polarisation rotator in said circular waveguide beyond said transmitter and receiver coupling means for switchably rotating the plane of polarisation through 45° in either sense, a first output coupling coupled to said circular waveguide beyond said first Faraday polarisation rotator and arranged for coupling to the waveguide for signals propagated in a $TE_{11}$ mode in a plane at 45° to said first and second orthogonal planes, a polarisation dependent short circuit in said waveguide beyond said first output coupling and arranged to prevent the transmission through the waveguide of signals polarised in a plane coupled to said first output coupling but to permit passage of signals polarised in an orthogonal plane, a second Faraday polarisation rotator in said circular waveguide beyond said polarisation dependent short circuit for switchably rotating the plane of polarisation alternatively through 0 and 90°, and second and third output couplings beyond said second Faraday polarisation rotator and coupled to the circular waveguide respectively for signals propagated in $TE_{11}$ modes in two orthogonal planes parallel to and at right angles to the plane of transmission of said polarisation dependent short circuit.

2. A multi-port aerial switch and duplexer as claimed in claim 1 wherein a further output coupling leading to a dummy load is coupled to said circular waveguide between said polarisation dependent short circuit and said second Faraday polarisation rotator, which output coupling is coupled to the waveguide for signals propagated therein in a $TE_{11}$ mode with a plane of polarisation at right angles to that passed by said polarisation dependent short circuit.

3. A multi-port aerial switch and duplexer as claimed in claim 1 wherein said second and third outputs are waveguides extending radially from said circular waveguide in orthogonal directions at right angles to the axis of said circular waveguide.

4. A multi-port aerial switch and duplexer as claimed in claim 3 wherein said circular waveguide is terminated with a short circuit beyond said second and third outputs.

5. A multi-port aerial switch and duplexer as claimed in claim 1 wherein said transmitter and receiver couplings are waveguides extending radially from said circular waveguide in orthogonal directions at right angles to the axis of said circular waveguide.

6. A multi-port aerial switch and duplexer as claimed in claim 5 wherein said circular waveguide at the end adjacent said transmitter and receiver couplings is terminated in a short circuit.

References Cited in the file of this patent

UNITED STATES PATENTS

| | | |
|---|---|---|
| 2,885,677 | Zaleski | May 5, 1959 |
| 2,890,328 | Fox | June 9, 1959 |